Figure 1:
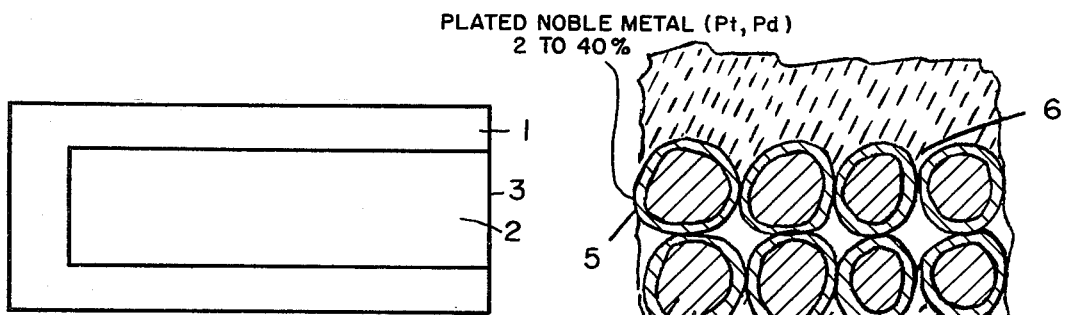

United States Patent [19]
Hertz

[11] 3,988,651
[45] Oct. 26, 1976

[54] MONOLITHIC CERAMIC CAPACITOR

[75] Inventor: Jerome Jay Hertz, Erie, Pa.

[73] Assignee: Erie Technological Products, Inc., Erie, Pa.

[22] Filed: May 23, 1975

[21] Appl. No.: 580,405

[52] U.S. Cl. .......................... 317/258; 29/192 CP; 106/1
[51] Int. Cl.² ......................................... H01G 1/01
[58] Field of Search ................... 317/258; 106/1; 252/513, 514; 29/192 CP

[56] References Cited
UNITED STATES PATENTS

| | | | |
|---|---|---|---|
| 2,060,081 | 11/1936 | Jedele | 29/192 CP |
| 3,237,066 | 2/1966 | Martin | 317/258 |
| 3,872,360 | 3/1975 | Sheard | 317/258 |

*Primary Examiner*—E. A. Goldberg
*Attorney, Agent, or Firm*—Ralph Hammar

[57] ABSTRACT

A monolithic ceramic capacitor having fritless electrodes of nickel or other base metal particles coated with a precious metal such as platinum. The coating may be very thin and typically applied by electroless plating and/or electroplating. The particles may be used as the sole pigment for the electrodes or the particles may be mixed with other compatible pigments.

9 Claims, 4 Drawing Figures

PLATED NOBLE METAL (Pt, Pd) 2 TO 40%

BASE METAL (Ni)

HIGH K TITANATE

COFIRED IN REDUCING ATMOSPHERE

MONOLITHIC CERAMIC CAPACITOR

This invention is a monolithic ceramic dielectric capacitor having fritless electrodes of nickel or other base metal particles of pigment size which have been plated with thin coatings of platinum, palladium, etc.

The coating on the base metal particles is not sufficiently dense to protect the base metal from oxidation if the capacitors are sintered in air above 1000° C so the sintering is done in a slightly reducing atmosphere. The coating, however, will protect the base metal particles when the capacitors are subsequently fires in air below 1000° C to fuse the silver terminations and to fully oxidize the dielectric.

In the drawing

Figure 4:
Figure 2:
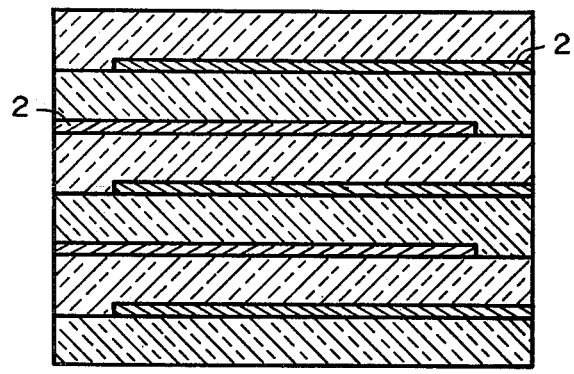
Figure 3:
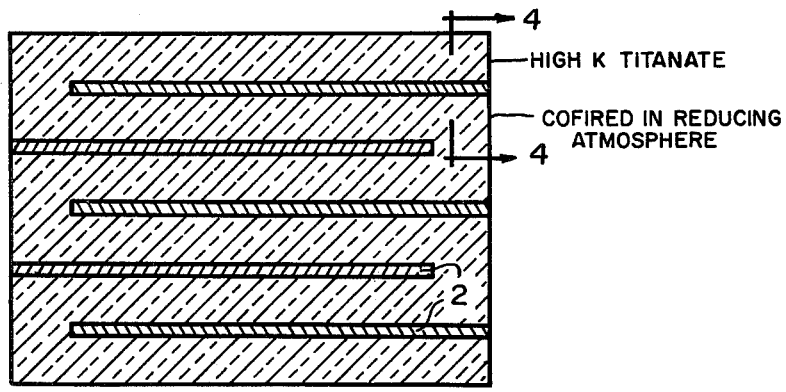

FIG. 1 is a plan view of the layer of green Ceramic on which an electrode pattern has been painted, FIG. 2 is a sectional elevation of a plurality of layers stacked to form a capacitor, and FIG. 3 is a view of FIG. 2 after firing, and FIG. 4 is a diagram.

The manufacture of the capacitor starts with a layer 1 of green ceramic dielectric, for example a high K titanate. Such ceramics consists of mixtures of barium titanate with other oxides, titanates, zirconates, stannates, etc. or precursors thereof. The layer also contains temporary binders and other ingredients which aid in processing and which are eliminated during firing. These ceramics are well known to the art and many variations are described in the patent literature. The layer 1 has painted thereon an electrode pattern 2 which extends to one edge 3 and is margined inward from the other edges to provide an insulation border. The layers 1 are stacked one on top of the other with alternate layers turned end for end as shown in FIG. 2. The stacked layers are then pressed together and fired or sintered into a monolith as shown in FIG. 3. The firing temperatures are high, 1000°–1400° C. The firing atmosphere is reducing e.g. low oxygen partial pressure (1 – 1000 microns) such as obtained by $CO_2/CO$ mixture. The thickness of the layer 1 depends on the voltage rating and may be from 1 to 3 mils or more. Instead of the high temperature precious metals, the electrode patterns 2 are of pigment size particles of nickel thinly plated or coated with platinum, palladium, etc. The pattern 2 is applied as a paint in which the coated particles are suspended in a fritless vehicle which completely disappears during the initial part of the ceramic firing cycle. The sole purpose of the vehicle is to cause the paint to adhere to the green ceramic and for this purpose many resins and thinners are known. The firing shrinkage of the ceramic results in mechanical compression of the coated nickel particles between layers of ceramic dielectric bringing the particles into intimate contact with the dielectric to maximize the capacitance and also bringing the particles into intimate contact with each other to minimize resistance. Both of these improve the capacitor.

At the end of the firing, the layers are sintered into a monolith with the contiguous surfaces of the ceramic sintered together so the individual ceramic layers are no longer distinguishable as in the unfired state shown in FIG. 2. The capacitor is completed by making terminal connections to the exposed edges of the electrode 2 in the usual manner, for example by an air fired paint of silver pigment, frit and a vehicle.

The coating on the base metal particles is not sufficiently dense to protect the base metal from oxidation if the capacitors are sintered in air above 1000° C so the sintering is done in a slightly reducing atmosphere. The coating, however, will protect the base metal particles when the capacitors are subsequently fired in air below 1000° C to fuse the silver terminations and to fully oxidize the dielectric.

In FIG. 4 the nickel particles 4 of pigment size, micron or submicron, are each shown with a thin layer 5 of plated platinum or palladium. On a weight basis the coating 5 comprises 2 to 40% of the total weight of the particles. This gives a substantial saving in precious metal cost. The thickness of the coating 5 is a small fraction of the diameter of the particles 4.

If the coatings 5 were omitted, the nickel particles would oxidize during the air firing of the silver paint and increase the resistance of the electrodes above the value required for capacitors. The absence of frit in the electrodes improves the capacity because the pigment particles are partially embedded in the ceramic as indicated at 6 so there is no intervening frit or air gap which would reduce the capacity.

What is claimed:

1. A ceramic capacitor comprising a sintered ceramic monolith having electrodes in a capacity relation to each other through portions of said monolith, said electrodes comprising fritless patterns of pigment size particles of base metal individually coated with noble metal said coating comprises a minor percent of the weight of said particles, said patterns being margined inward from edges of said monolith, said particles being compressed against said monolith and against each other, said capacitor having been formed by a process involving stacking binder containing sheets of green ceramic and having painted thereon said fritless patterns margined inward from edges of said sheets, said fritless patterns comprising said pigment size particles dispersed in a vehicle for adhering the particles to the green ceramic, and ceramically firing the stacked sheets into a monolith in a reducing atmosphere, said binder and vehicle being eliminated during ceramic firing, said green ceramic being converted into said monolith during said ceramic firing with margined edges of the ceramic sintered together, said particles being indifferent to the balance of said monolith and to said coatings during said firing and the ceramic shrinkage during said firing compressing said particles against the monolith and against each other.

2. The capacitor of claim 1 in which said base metal comprises nickel.

3. The capacitor of claim 1 in which the ceramic comprises barium titanate.

4. The capacitor of claim 1 in which the coatings on said particles contain platinum.

5. The capacitor of claim 1 in which the coating on said particles contain palladium.

6. The capacitor of claim 4 in which the capacitor has terminals of silver paint fired on in an oxidizing atmosphere.

7. The capacitor of claim 5 in which the capacitor has terminals of silver paint fired on in an oxidizing atmosphere.

8. The capacitor of claim 1 in which the capacitor has terminals of silver paint fired on in an oxidizing atmosphere, said noble metal retards oxidation of the base metal during the firing of silver paint terminals.

9. The capacitor of claim 1 in which the capacitor has terminals of silver paint fired on in an oxidizing atmosphere.

* * * * *